(12) United States Patent
Yang (10) Patent No.: US 10,133,012 B1
(45) Date of Patent: Nov. 20, 2018

(54) OPTICAL FIBER ADAPTER

(71) Applicant: Muh-Chyng Yang, Kaohsiung (TW)

(72) Inventor: Muh-Chyng Yang, Kaohsiung (TW)

( * ) Notice: Subject to any disclaimer, the term of this patent is extended or adjusted under 35 U.S.C. 154(b) by 0 days.

(21) Appl. No.: 15/958,405

(22) Filed: Apr. 20, 2018

(30) Foreign Application Priority Data

Dec. 5, 2017 (CN) .......................... 2017 1 1270887

(51) Int. Cl.
*G02B 6/38* (2006.01)
*F21V 8/00* (2006.01)

(52) U.S. Cl.
CPC ......... *G02B 6/3897* (2013.01); *G02B 6/0005* (2013.01); *G02B 6/3825* (2013.01); *G02B 6/3874* (2013.01)

(58) Field of Classification Search
CPC .. G02B 6/3897; G02B 6/0005; G02B 6/3825; G02B 6/3874
USPC .......................................................... 385/92
See application file for complete search history.

(56) References Cited

U.S. PATENT DOCUMENTS

| | | | | |
|---|---|---|---|---|
| 6,116,790 A | * | 9/2000 | Vergeest | G02B 6/3821 385/55 |
| 2015/0355414 A1 | * | 12/2015 | Chen | G02B 6/3807 385/76 |

* cited by examiner

*Primary Examiner* — Jerry Blevins
(74) *Attorney, Agent, or Firm* — Rosenberg, Klein & Lee (57) ABSTRACT

The optical fiber adapter of the present disclosure includes an outer housing and an inner housing. The outer housing has a chamber surrounded by four walls. A first plate, a first alignment cylinder and two stop blocks are formed in the chamber. The first alignment cylinder extends from the first plate, and the two stop blocks are respectively formed on two of the four walls. The inner housing includes a second plate, a second alignment cylinder and two retaining clips. The second alignment cylinder extends in a longitudinal direction from the second plate. The two retaining clips are formed on the second plate, and each of the retaining clips includes a bending part, an extending part and a hooking part. The bending part has an arcuate cross-section and extends from the second plate. The extending part extends out from the rear end of the bending part in a direction parallel to the longitudinal direction. The hooking part has a wedge shape and is formed on an outer surface of the rear end of the extending part. The hooking parts of the two retaining clips are respectively hooked onto the two stop blocks, thereby preventing the inner housing from being pulled out of the outer housing.

5 Claims, 11 Drawing Sheets

OPTICAL FIBER ADAPTER

RELATED APPLICATION

This application claims the priority benefit of Chinese Patent Application Number 201711270887.6, filed on Dec. 5, 2017, the full disclosure of which is incorporated herein by reference.

BACKGROUND

1. Technical Field

This disclosure generally relates to an optical fiber adapter, more particularly, to a one-piece optical fiber adapter.

2. Description of the Related Art

Recently, the use of fiber optics for communications purposes has grown immensely. Data, voice, and other communication networks are increasingly using fiber optics to carry information. An optical fiber is generally a glass fiber configured to carry light. Individual fibers may be grouped into a line capable of carrying large amounts of data simultaneously.

When constructing a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit without interruption. A typical connector includes two symmetrical housings, each housing having a connector latch. An alignment sleeve is placed within the connector latches to ensure the fibers are properly aligned. Then, the two housings are welded, riveted, or otherwise attached to each other, thereby forming a coupling. Individual optic fibers are then places within each connector latch, the alignment sleeve aligning the fibers.

This exemplary coupling is expensive to produce as numerous parts are required, and a welding, riveting or other attachment process must be done to connect the two symmetrical housings. Additionally, alignment issues may result from the attachment process as the two symmetrical housing components may shift during welding.

One approach to reduce the amount of components required is shown in U.S. Pat. No. 5,317,663, issued May 31, 1994 to Beard et al, the contents of which are incorporated herein by reference. In the above-identified patent, an adapter is taught which includes a single piece housing in which both connector latches are placed, along with an alignment sleeve, to provide an adapter. However, to place the components within the housing, a window is provided in the housing. A housing cover is provided which is welded to the housing to cover the window. While the design of the above-identified patent may eliminate any issues with alignment resulting from the attachment of the two housing components, it still requires numerous components and multiple assembly steps including welding the housing cover over the window.

Figure 1:
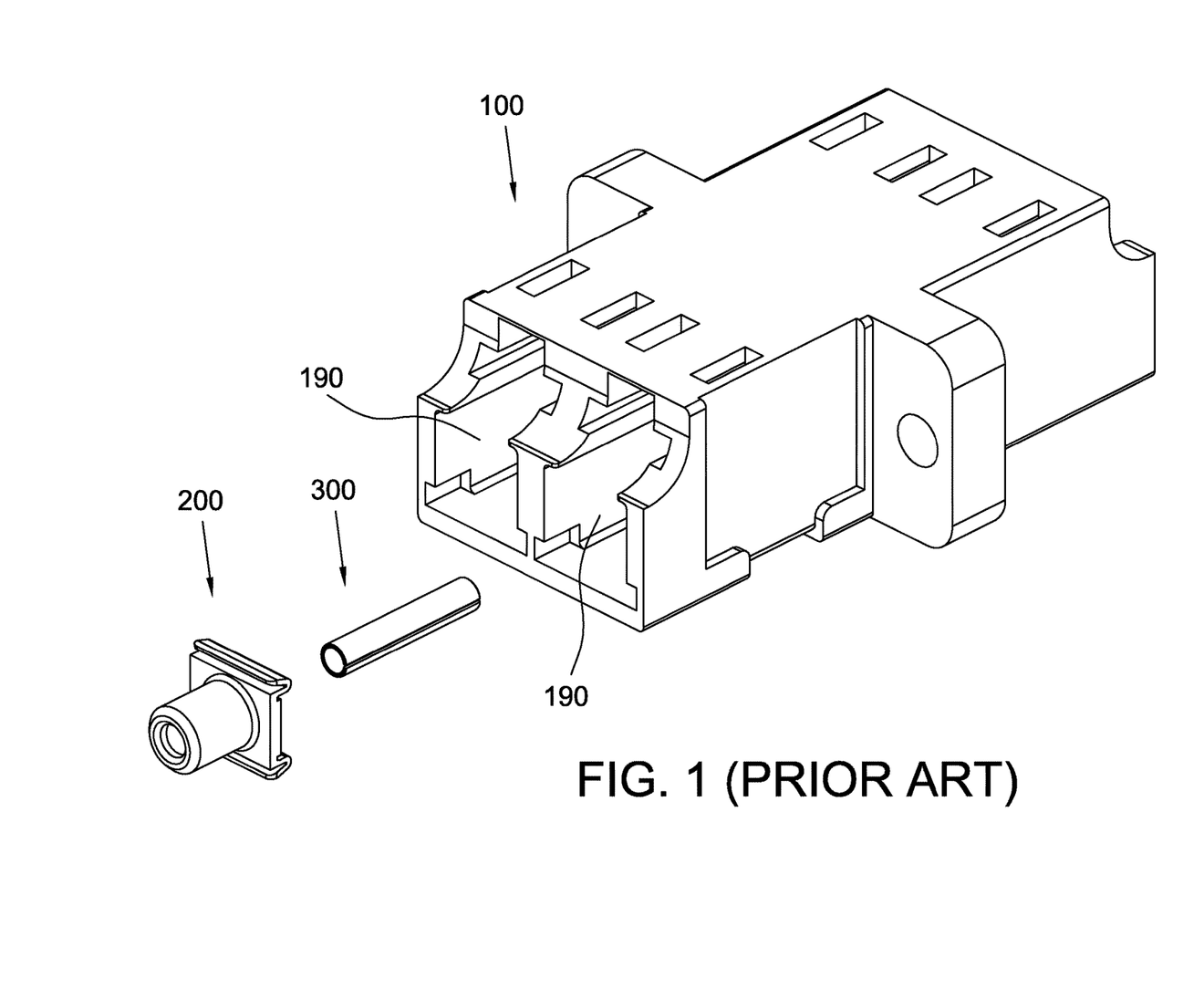
FIG. 1 is an exploded view of a conventional optical fiber adapter.

Referring to FIG. 1, a conventional LC duplex optical fiber adapter includes an outer housing 100, an alignment sleeve 300 and an inner housing 200.

Figure 2:
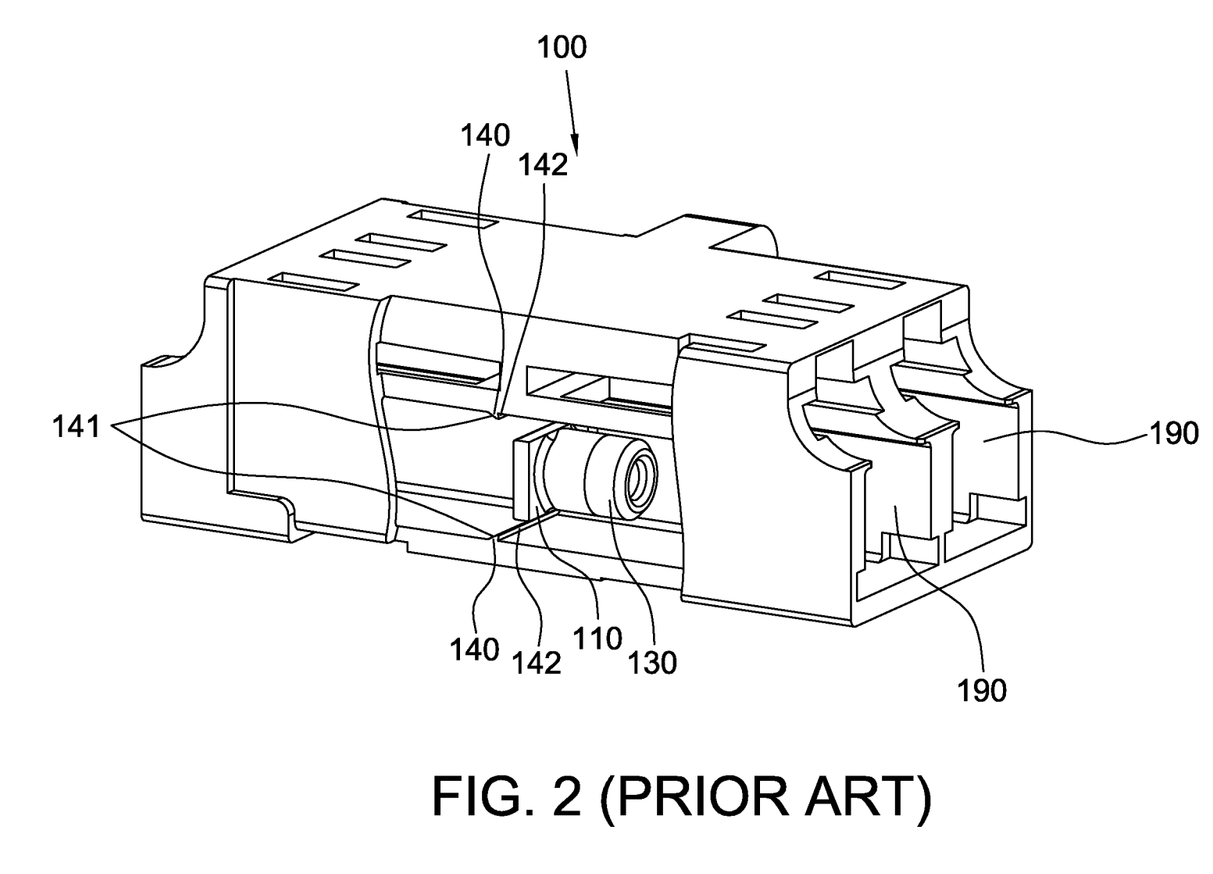
FIG. 2 shows the internal structure of the outer housing in the optical fiber adapter of FIG. 1.

Referring to FIG. 2, the outer housing 100 has a receiving room divided into two same halves defined respectively as left chamber 190 and right chamber 190. Each of the chambers 190 is surrounded by four walls, and a plate 110 and an alignment cylinder 130 are disposed inside. The plate 110 is generally rectangular and has four sides, wherein two of the four sides are connected to the left and right walls of the chamber 190 respectively and the other two sides are respectively located near but not connected with the upper and lower walls of the chamber 190. The alignment cylinder 130 extends from the plate 110. In addition, two wedge-shaped stop blocks 140 are formed inside the outer housing 100 and respectively disposed on the upper wall and lower wall of the chamber 190. Each of the wedge-shaped stop blocks 140 has a front surface 141 and a hooking surface 142.

Figure 3:
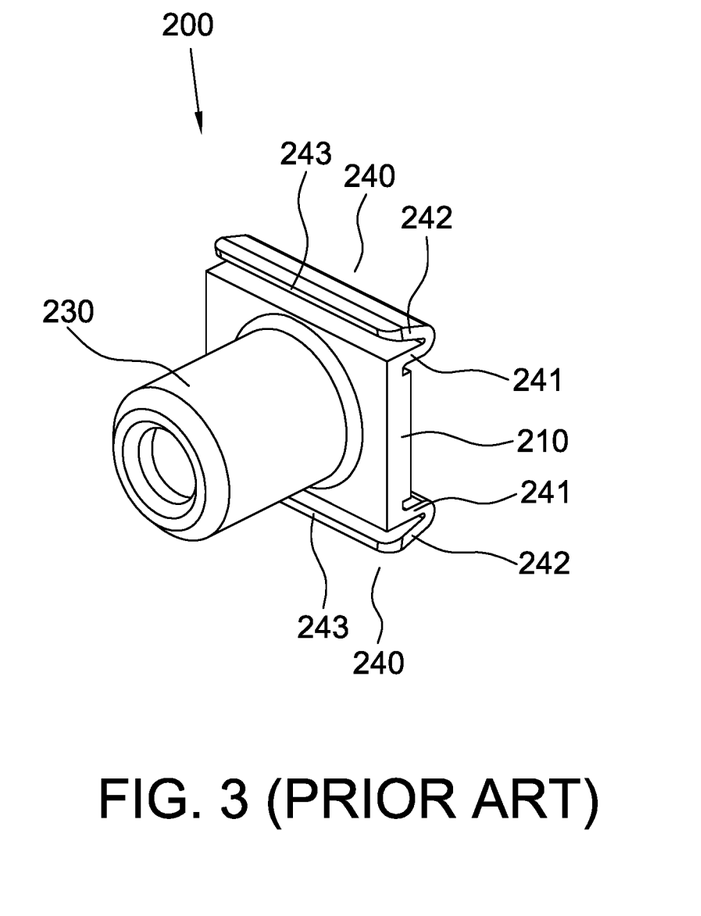
FIG. 3 is an elevated perspective view of the inner housing of the optical fiber adapter of FIG. 1.

Referring to FIG. 3, the inner housing 200 includes a plate 210 and an alignment cylinder 230 extending from the front surface of the plate 210. The alignment cylinder 230 has an opening at each of the front and rear ends, wherein the rear end opening is located on the plate 210. Two retaining clips 240 are oppositely disposed in position and respectively extend from two opposing sides of the back surface of the plate 210. Each of the retaining clips 240 includes a first extending part 241, a second extending part 242 and a hooking part 243, wherein the first extending part 241 and the second extending part 242 form a substantially V-shaped cross-section.

Figure 4:
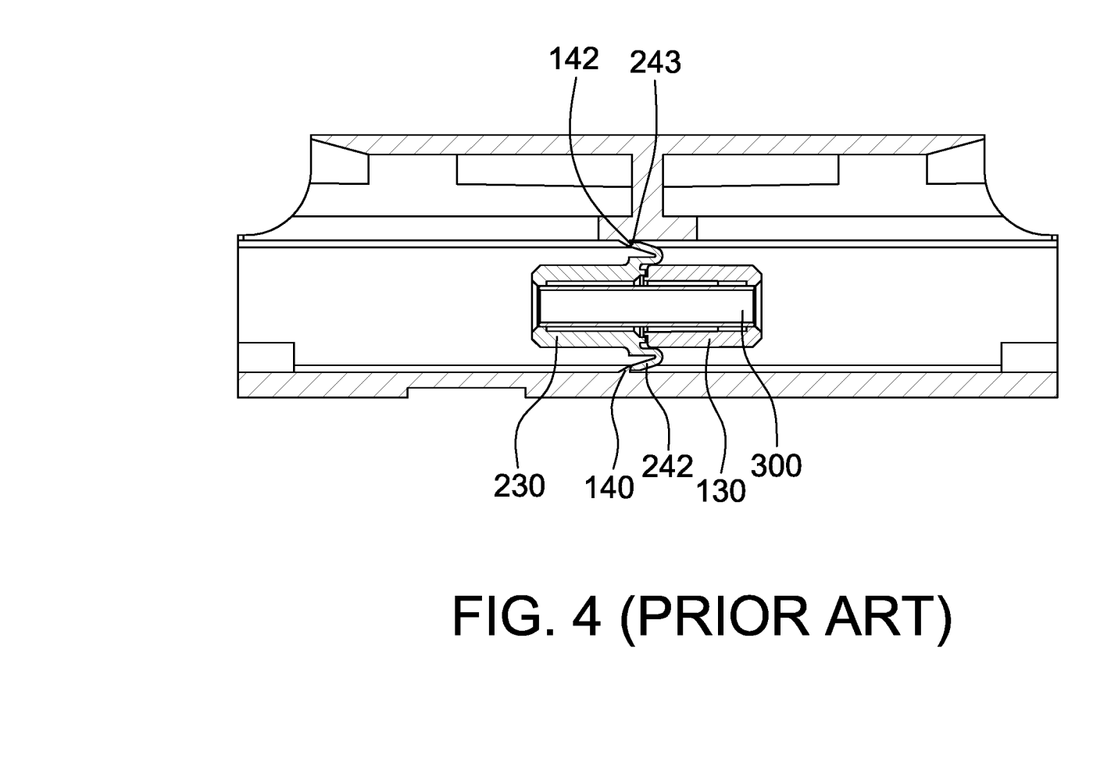
FIG. 4 is a cross-sectional view of the assembled optical fiber adapter of FIG. 1.

In the assembly of the above optical fiber adapter, one half of the alignment sleeve 300 is inserted into the rear end opening of the alignment cylinder 130. The inner housing 200 is then inserted into the chamber 190 of the outer housing 100 and the other half of the alignment sleeve 300 is inserted into the rear end opening of the alignment cylinder 230. FIG. 4 shows the assembled optical fiber adapter described above.

After the inner housing 200 is installed in place within the outer housing 100, the hooking parts 243 respectively abuts against the hooking surfaces 142 of the stop blocks 140 to prevent the inner housing 200 from being pulled out of the outer housing 100. In addition, the first extending parts 241 and the second extending parts 242 are compressed and inserted into the gaps between the plate 110 and the upper and lower walls of the chamber 190, respectively.

However, the connections between the first extending parts 241 and the second extending parts 242 are greatly stressed since the first and second extending parts 241, 242 are severely compressed. This therefore results in the failure of the retaining clips 240 after a long time.

SUMMARY

The present disclosure provides an optical fiber adapter.

The optical fiber adapter of the present disclosure includes an outer housing and an inner housing. The outer housing has a chamber surrounded by four walls. A first plate, a first alignment cylinder and two stop blocks are formed in the chamber. The first alignment cylinder extends from the first plate, and the two stop blocks are respectively formed on two of the four walls. The inner housing includes a second plate, a second alignment cylinder and two retaining clips. The second alignment cylinder extends in a longitudinal direction from the second plate. The two retaining clips are formed on the second plate, and each of the retaining clips includes a bending part, an extending part and a hooking part. The bending part has an arcuate cross-section and extends from the second plate. The extending part extends out from the rear end of the bending part in a direction parallel to the longitudinal direction. The hooking part has a wedge shape and is formed on an outer surface of the rear end of the extending part. The hooking parts of the two retaining clips are respectively hooked onto the two stop blocks, thereby preventing the inner housing from being pulled out of the outer housing.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE PREFERRED EMBODIMENT

Figure 5:
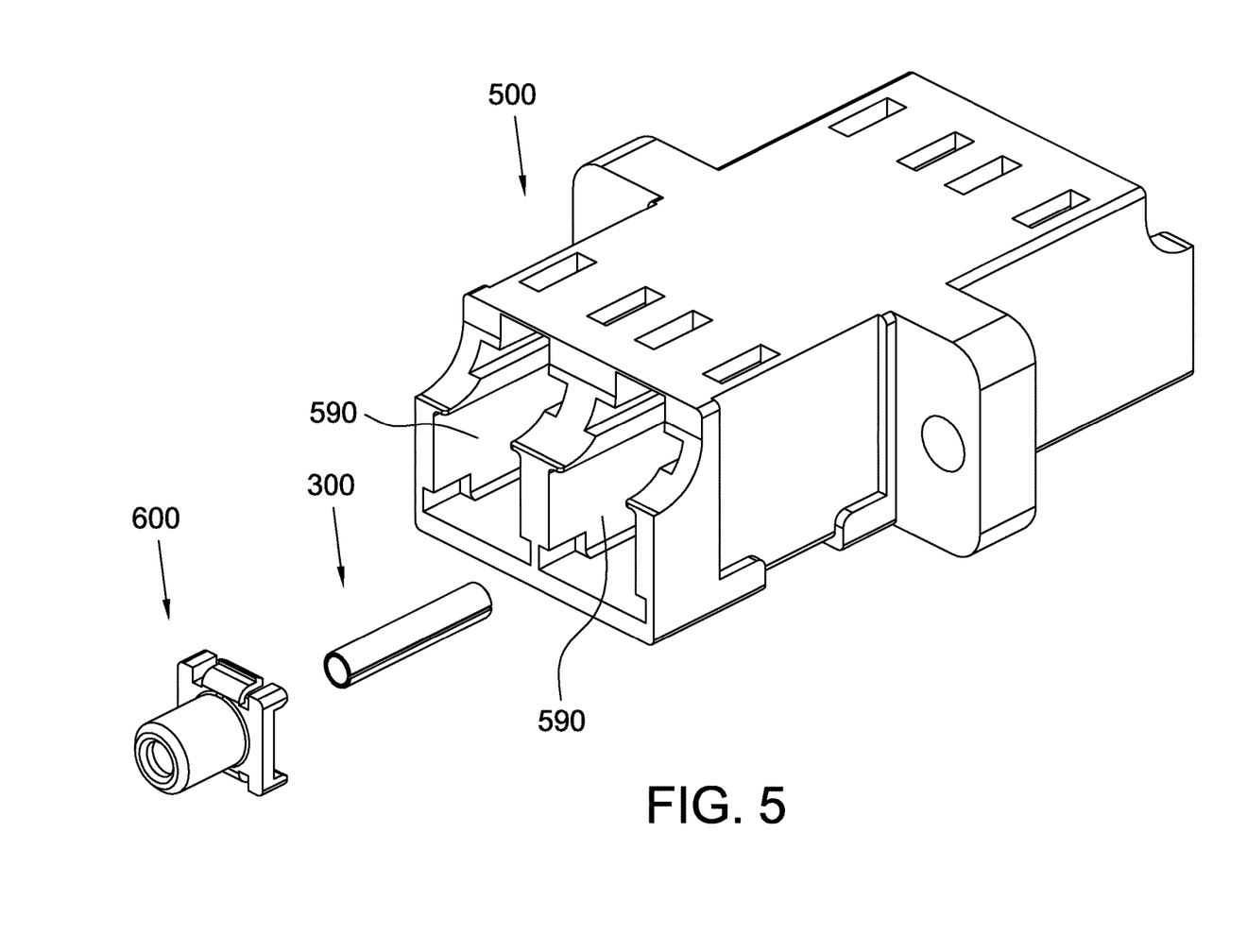
FIG. 5 is an exploded view of the optical fiber adapter of the present disclosure.

Referring to FIG. 5, the optical fiber adapter of the present disclosure may be an LC type optical fiber adapter and includes an outer housing 500, an alignment sleeve 300 and an inner housing 600.

Figure 6A:
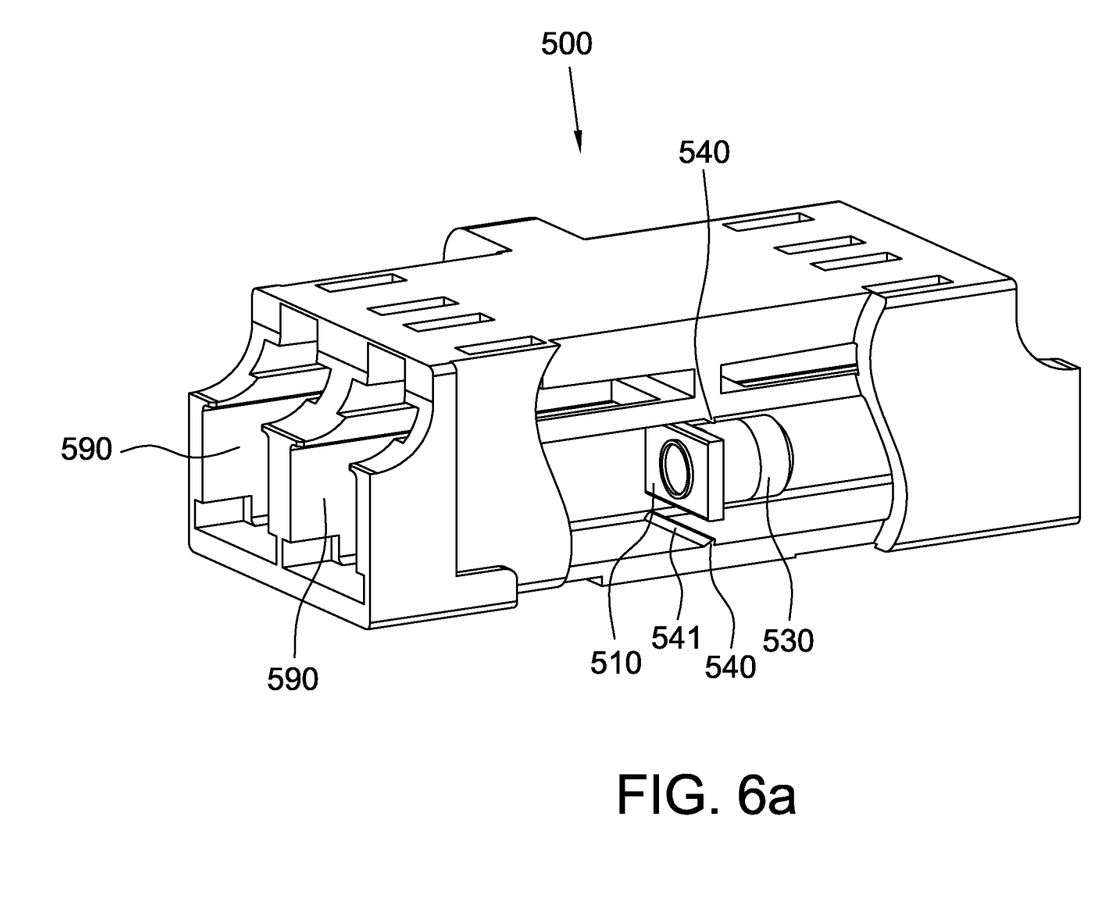
FIGS. 6a and 6b show the internal structure of the outer housing of the optical fiber adapter of the present disclosure.
Figure 6B:
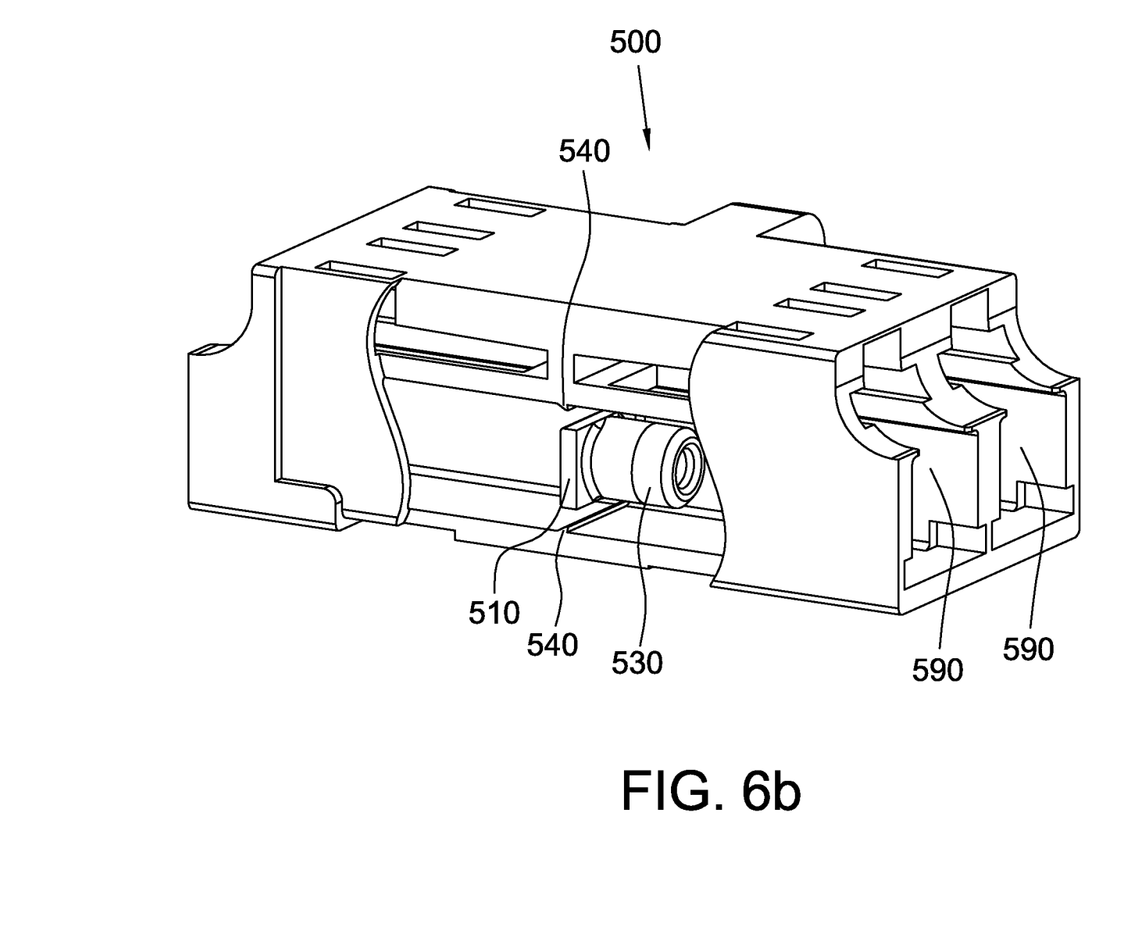
Figure 6C:
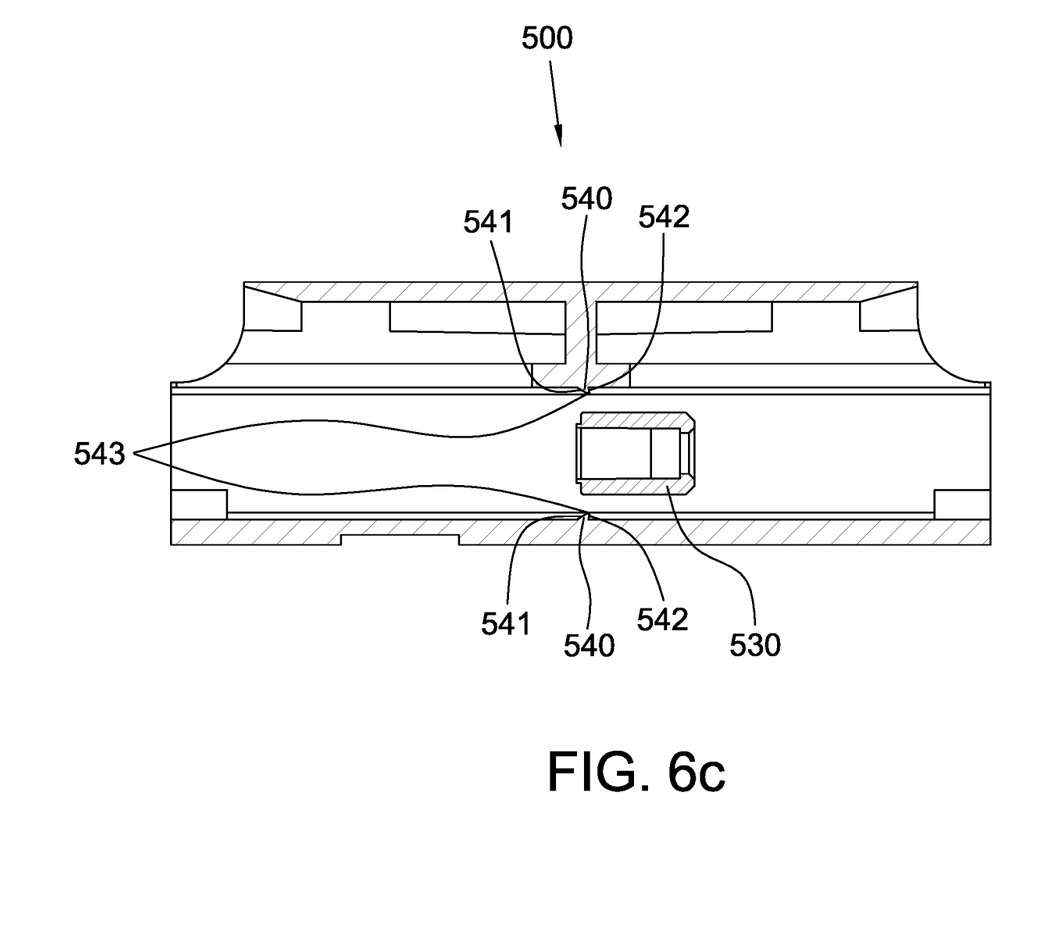
FIG. 6c is a cross-sectional view of the outer housing of the optical fiber adapter of the present disclosure.

The outer housing 500 may be constructed of plastics by an injection molding process. Referring to FIGS. 6a to 6c, the outer housing 500 is hollow and has a generally rectangular shape in cross section. The outer housing 500 has a receiving room divided into two same halves defined respectively as left chamber 590 and right chamber 590. Each of the chambers 590 is surrounded by four walls named respectively as left wall, right wall, upper wall and lower wall. A plate 510 and an alignment cylinder 530 are disposed in each of the chambers 590. The plate 510 is generally rectangular and has four sides, wherein two of the four sides are connected to the left and right walls of the chamber 590 respectively and the other two sides are respectively located near but not connected with the upper and lower walls of the chamber 590. The alignment cylinder 530 extends from the plate 510 in a longitudinal direction and has an opening at each of the front and rear ends, wherein the rear end opening is located on the plate 510. The alignment cylinder 530 and the plate 510 may be formed with the outer housing 500 in a single injection molding process. In addition, two wedge-shaped stop blocks 540 are formed inside the outer housing 500 and respectively disposed on the upper wall and lower wall of the chamber 590. Each of the wedge-shaped stop blocks 540 has a front surface 541, a hooking surface 542 and a top surface 543. The two front surfaces 541 are inclined planes and face a same opening of the chamber 590. The angle between the two front surfaces 541 and the upper or lower wall of the chamber 590 is greater than 90 degrees. The two hooking surfaces 542 are inclined planes and face the other opening of the chamber 590. The angle between the two hooking surfaces 542 and the upper or lower wall of the chamber 590 is less than 90 degrees. The top surface 543 is a flat plane and connects the front surface 541 and the hooking surface 542. The top surface 543 is parallel to the upper or lower wall of the chamber 590.

Figure 7A:
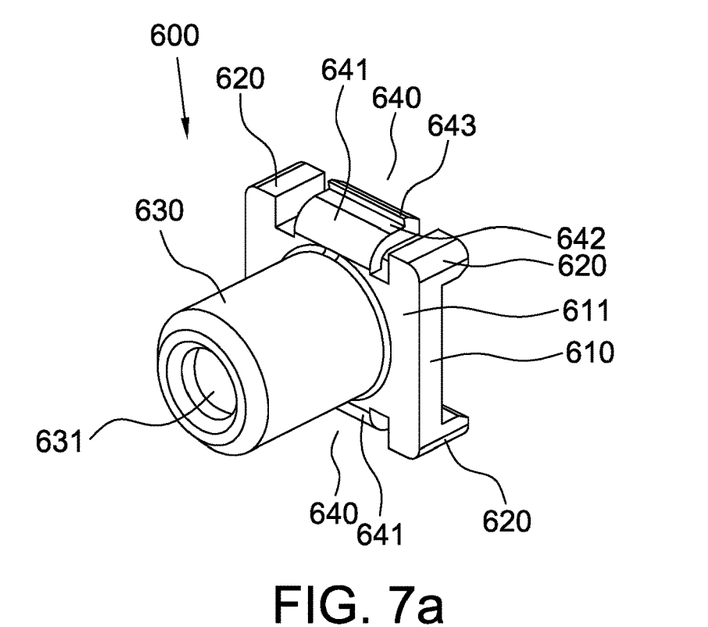
FIG. 7a is an elevated perspective view of the inner housing of the optical fiber adapter of the present disclosure.
Figure 7B:
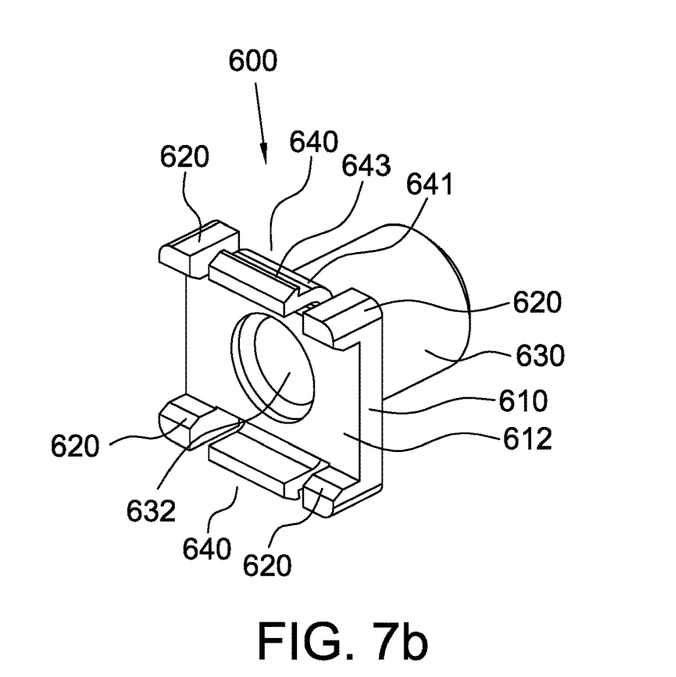
FIG. 7b is another elevated perspective view of the inner housing of the optical fiber adapter of the present disclosure.
Figure 7C:
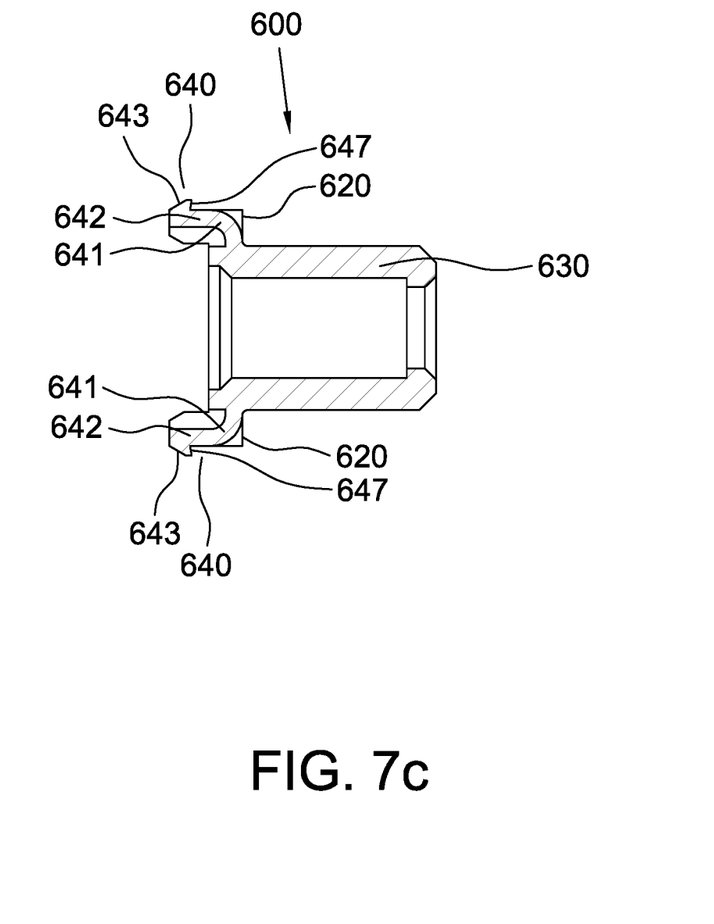
FIG. 7c is a cross-sectional view of the inner housing of the optical fiber adapter of the present disclosure.

The inner housing 600 may be constructed of plastics by an injection molding process. Referring to FIGS. 7a to 7c, the inner housing 600 includes a generally rectangular plate 610 having a front surface 611 and a back surface 612. A hollow alignment cylinder 630 extends in the longitudinal direction from the front surface 611 of the plate 610. Openings 631, 632 are respectively formed at the front and rear ends of the alignment cylinder 630, wherein the rear opening 632 is right located at the plate 610. The alignment cylinder 630 has a hollow circular cross-section in a transverse direction transverse to the longitudinal direction. Two supporting arms 620 are disposed at each of two opposing sides of the plate 610. The four supporting arms 620 extend from the sides of the plate 610 in a direction opposite to the direction in which the alignment cylinder 630 extends from the plate 610. In addition, two retaining clips 640 are oppositely disposed in position and respectively extend from the two opposing sides of the plate 610, wherein each of the retaining clips 640 is located between two of the four supporting arms 620 and includes a bending part 641, an extending part 642 and a hooking part 643. The bending part 641 has generally an arcuate cross-section and extends out from one side of the plate 610. The extending part 642 extends out from the rear end of the bending part 641 in a direction parallel to the longitudinal direction. The hooking part 643 has generally a wedge shape and is formed on an outer surface of the rear end of the extending part 642. The hooking part 643 has a flat hooking surface 647 and the angle between the hooking surface 647 and an outer surface of the extending part 642 is less than 90 degrees.

Figure 8:
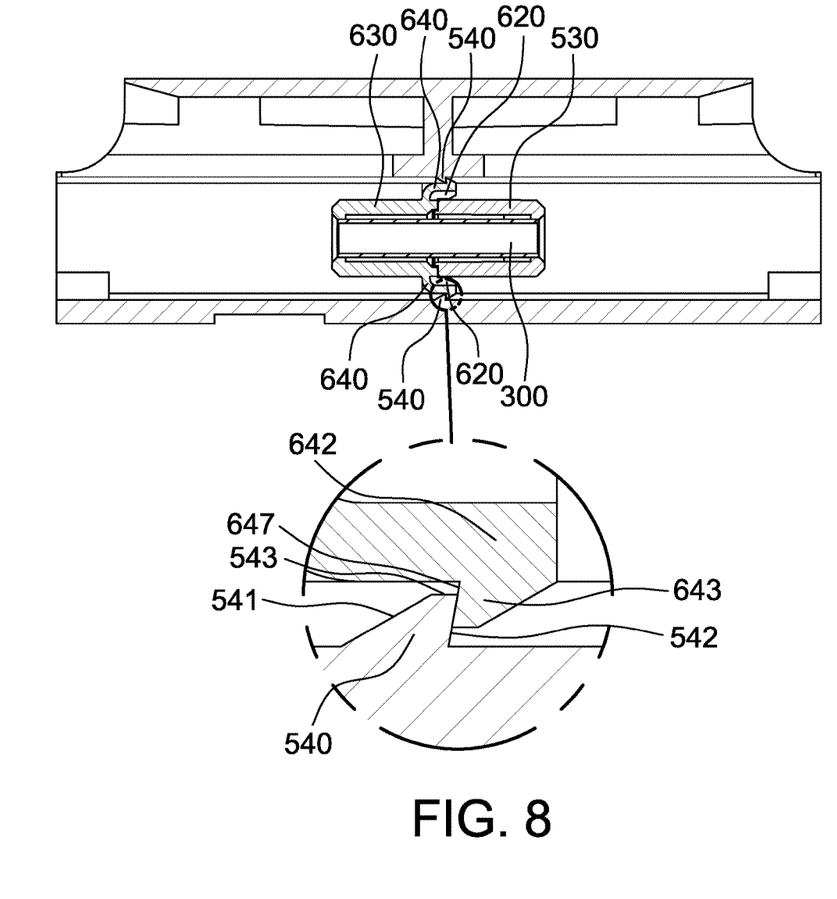
FIG. 8 is a cross-sectional view of the optical fiber adapter of the present disclosure.

In the assembly of the optical fiber adapter of the present disclosure, one half of the alignment sleeve 300 is inserted into the rear end opening of the alignment cylinder 530. The inner housing 600 is then inserted into the chamber 590 of the outer housing 500 and the other half of the alignment sleeve 300 is inserted into the rear end opening of the alignment cylinder 630. FIG. 8 shows the assembled optical fiber adapter of the present disclosure.

According to the optical fiber adapter of the present disclosure, the retaining clips 640 will be compressed by the stop blocks 540 respectively and the hooking parts 643 will respectively slide on the top surfaces 543 of the stop blocks 540 when the inner housing 600 is inserted into the chamber 590. Referring to FIG. 8, when the inner housing 600 is positioned in place within the outer housing 500, the hooking surfaces 647 of the hooking parts 643 will respectively abut against the hooking surfaces 542 of the stop blocks 540 to prevent the inner housing 600 from being pulled out of the outer housing 500. In addition, the supporting arms 620 are inserted into the gaps between the plate 510 and the upper or lower wall of the chamber 590.

According to the optical fiber adapter of the present disclosure, the ferrule of an optical fiber connector along with the optical fiber therein may be inserted into the alignment cylinder 530 and arrive at one end of the alignment sleeve 300. Similarly, the ferrule of another optical fiber connector along with the optical fiber therein may be inserted into the alignment cylinder 630 and arrive at the other end of the alignment sleeve 300. In this manner the ferrules of the two optical fiber connectors are brought to being in contact with each other to allow the optical fibers therein to be butted together.

After the inner housing 600 is installed in place within the outer housing 500, the retaining clips 640 will not be compressed anymore by the stop blocks 540. Therefore, the retaining clips 640 are less stressed and the reliability of the optical fiber adapter of the present disclosure is greatly improved. Furthermore, the supporting arms 620 inserted between the plate 510 and the upper or lower wall of the chamber 590 may prevent the inner housing 600 from swaying in the outer housing 500.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical fiber adapter, comprising:
    an outer housing having a chamber surrounded by four walls, the outer housing further comprising a first plate, a first alignment cylinder and two stop blocks formed in the chamber, the first alignment cylinder extending from the first plate for receiving a first optical fiber, the two stop blocks being respectively formed on two of the four walls; and
    an inner housing disposed in the chamber of the outer housing, the inner housing comprising:
        a second plate;
        a second alignment cylinder extending from the second plate in a longitudinal direction for receiving a second optical fiber; and
        two retaining clips formed on the second plate, each of the retaining clips comprising a bending part, an extending part and a hooking part, the bending part having an arcuate cross-section and extending from the second plate, the extending part extending from a rear end of the bending part in a direction parallel to the longitudinal direction, the hooking part having a wedge shape and being formed on an outer surface of a rear end of the extending part, wherein the hooking parts of the two retaining clips are respectively hooked onto the two stop blocks to prevent the inner housing from being pulled out of the outer housing.

2. The optical fiber adapter as claimed in claim 1, wherein the two bending parts extend out from two sides of the second plate.

3. The optical fiber adapter as claimed in claim 1, wherein the inner housing further comprising:
    four supporting arms extending from the second plate, wherein the four supporting arms are inserted into gaps formed between the first plate and the walls to prevent the inner housing from swaying in the outer housing.

4. The optical fiber adapter as claimed in claim 3, wherein each of the retaining clips is located between two of the four supporting arms.

5. The optical fiber adapter as claimed in claim 1, wherein the optical fiber adapter is LC type.

* * * * *